Sheet 1. 2 Sheets
D. B. Waite,
Making Watch & Locket Rims,
Nº 32,905.    Patented July 23, 1861.
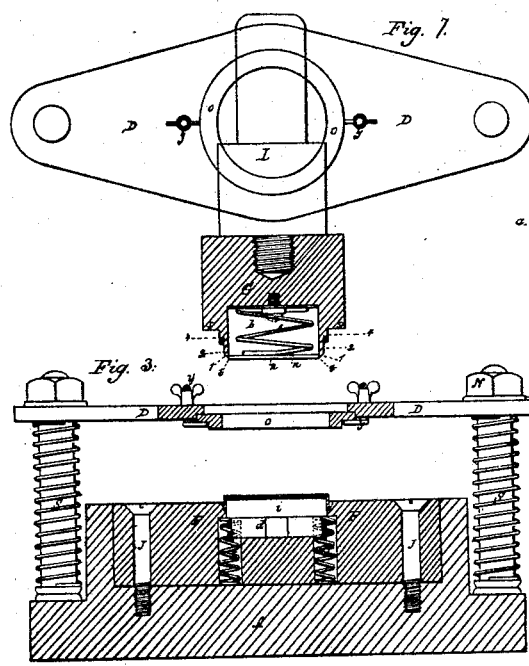
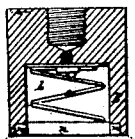
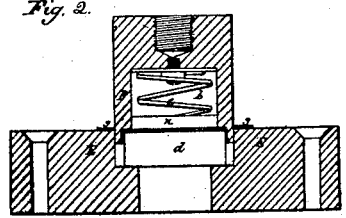
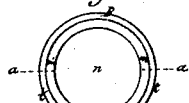
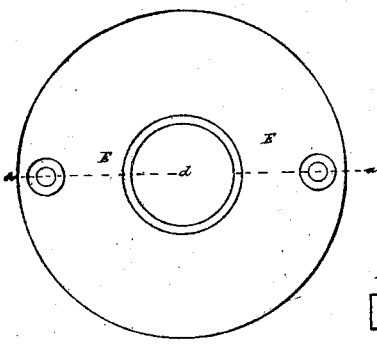
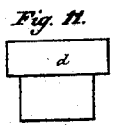
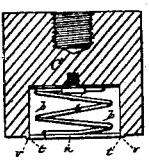
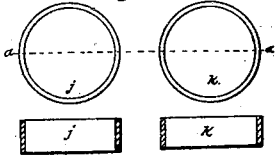
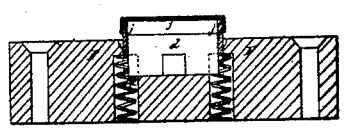
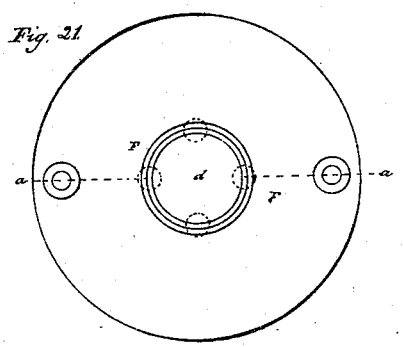
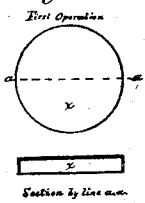
Witnesses
Isaac A. Brunell.
Reynolds L. Waite.
Inventor
Daniel B. Waite Sheet 2. 2 Sheets D. B. Waite,
Making Watch & Locket Rims, No 1,901,
No 32,905,
Patented July 23, 1861.

Snap Locket Rims. Process.

Fig. 12.    Fig. 13.    Fig. 14.    Fig. 15.

Refuse stock    First Operation    Second Operation    Refuse stock.

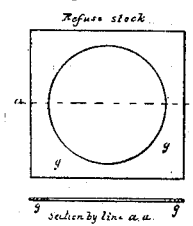
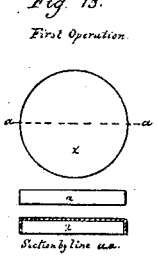
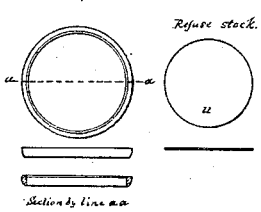
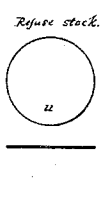

Section by line a.a.    Section by line a.a.    Section by line a.a.

Fig. 4.        Fig. 5.

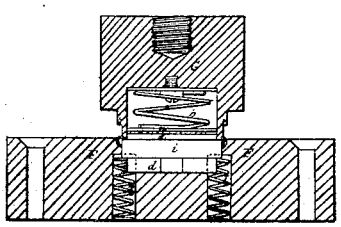
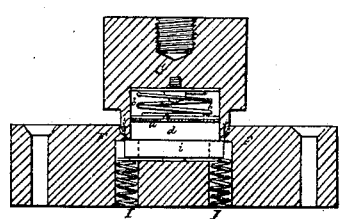

Fig. 6.

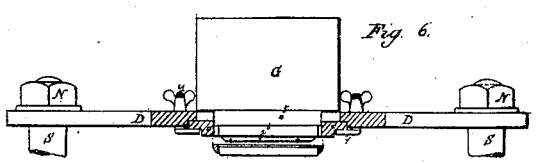

Fig. 17.        Fig. 18.

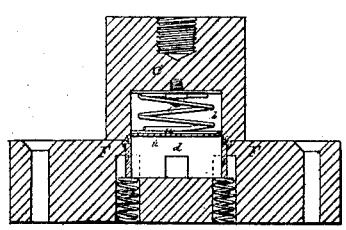
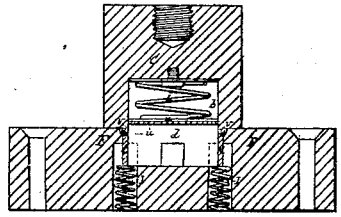

Fig. 23.    Fig. 24.
Spring Locket Rims. Process.
Second Operation    Second Operation

Fig. 19.

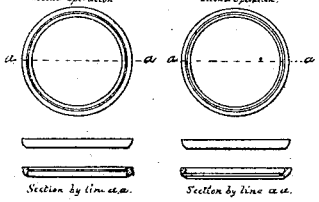
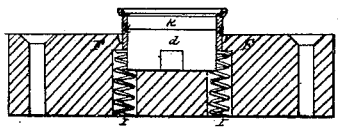

Section by line a.a.    Section by line a.a.

Witnesses.
Isaac A. Brunell.
Reynolds L. Waite.

Inventor
Daniel B. Waite

UNITED STATES PATENT OFFICE.

DANIEL B. WAITE, OF PROVIDENCE, RHODE ISLAND.

WATCH AND SOCKET RIM.

Specification of Letters Patent No. 32,905, dated July 23, 1861.

*To all whom it may concern:*

Be it known that I, DANIEL B. WAITE, of Providence, in the county of Providence and State of Rhode Island, have invented a new and Improved Method of Making Watch and Locket Rims from Sheet Metal, Tubing, &c.; and I do hereby declare that the following is a full, clear, and exact description of the same, reference being had to the accompanying drawings, forming part of this specification, in which—

Figure 1, is a vertical section of a combined cutting former and die (B,) and a cutting die (E,) and stationary former (*d*,) employed in performing the first operation in making "snap locket" rims. Fig. 2, is a like view of the same illustrating the first operation. Fig. 3, is a vertical section of a cutting former (G,) and a die, and former (F,) (*d*), with the bed piece A, and improved clearer D, employed in performing the second operation of the process. Figs. 4, 5, 6, illustrate by similar views the relative position of the parts and their action on the stock in performing the second operation. Fig. 7, is a plan of the clearer D. Fig. 8, is a plan and section of the collar *i*, (Fig. 3.) Fig. 9, is a plan of the face of the combined cutting former and die (B), (Fig. 1.) Fig. 10, is a plan of the cutting die (F,) and former (*d*) (Fig. 1.) Fig. 11, is a side view of the former (*d*) detached. Figs. 12, 13, 14, 15, illustrate by plans and sections the form which the stock is made to assume, in the process of making "snap locket" rims. Fig. 16, is a vertical section of a cutting former *c*, and die and former (F, *d*,) employed in making "spring locket" rims from the stock as it comes from the first operation (Fig. 15.) Fig. 17, is a like view of the same parts showing their action in forming the "male" rim of a spring locket. Fig. 18, is a vertical section of similar parts in the act of forming the "female" rim. Fig. 19, is a transverse section of the die showing the action of the springs I, and collar *k*, in raising the finished rim from the die. Fig. 20, is a view by plan and section of the collars *j* and *k*, employed in the die (F) for forming the male and female rims respectively. Fig. 21, is a plan of the die plate F. Figs. 22, 23, 24, represent by plan and section, the form which the stock is made to assume by the different operations in the process of making spring locket rims.

Similar characters of reference denote like parts in the different figures.

By the method heretofore employed in making rims of watches lockets, &c., three operations have been found necessary, the first being to cut from the sheet metal a circular piece or disk of the proper size for the rim, the second operation being to press this disk into a flaring disk form and punch the disk which constitutes the bottom of the disk therefrom by means of a "combined die and cutter" in combination with "a plunger," the third operation being to place this flaring ring in a die beneath a "male and female plunger" which descends and turns the ring so that what was one surface or side of the metal in the sheet forms the entire surface of the locket rim, which in this operation is completed. This method is fully set forth and described in the specification attached to the patents of Charles G. Bloomer of April 28th 1857, and of Charles W. Clewley September 6th 1859, and of June 19th 1860.

The object of my invention is to accomplish by two operations the same work in a more perfect form, for which three operations are required in the method above described.

My invention consists, first, in the employment of a peculiar hollow cutting former and die, combined with a peculiar cutting die and fixed former, which, by the descent of the former cuts the stock which is to form the locket rim, from the sheet and forms it into a circular box cover, at one operation. Second, in the employment of a hollow cutting former of a peculiar construction, in combination with a forming die and fixed forms combined, and provided with a sliding collar for guiding the box cover, or stock, in such a manner that the descent of the hollow former cuts the refuse disk from the center of the box cover to form a ring, and continuing turns the severed edge of the ring downward, folds the edges together, and presses the doubled ring into the die successively, at one operation, thereby forming a finished locket rim. Third, in the use of a vertically sliding clearer attached to the bed piece of a press and provided with means for attaching and detaching at pleasure a ring suited to the size of the hollow former, whose office is to free the adhering locket rim from the outside of the former as it ascends. Fourth, in the employment of a hollow cutting former having an annular ridge projecting from its face, in combination with a combined forming die and fixed former having a sliding collar for guiding the box cover or stock so arranged that by the descent of the former the refuse disk is cut from the box cover, or stock and the ring so formed turned, doubled, and pressed into the form of a spring locket rim and field piece successively at one operation. Fifth in varying the projecting ridge upon the hollow former, and the width of the sliding collar in a manner to sink the field piece more or less from the face of the rim, or, to produce a field piece of greater or less width. Sixth in the employment of a sliding piston actuated by a spiral spring or like force within the hollow formers for expelling the refuse disk which is cut from the box cover, from the hollow recess of such former.

To enable others skilled in the art to make and use my invention I will proceed to describe the construction and operation of the same.

In Fig. 1 of the accompanying drawings B is the combined cutting former and die, which is attached to the plunger of a common press by screwing it upon a plug L projecting from the lower end thereof. This former is hollow having a cylindrical recess $b$, formed therein, in which is arranged a piston $n$, attached to the spiral spring $l$, which is fastened by a screw to the uppermost part of the recess. $m$ is a die formed in the face of the former (B) at the entrance of the recess $b$, which gives shape to the outside of the box cover, (Figs. 13 and 22.) The outside edge on the face of the former at $t$, is made sharp and to fit snugly the circular recess which forms the cutting die E. Within this recess of the cutting die is placed a fixed former $d$, the top of which is the thickness of the stock below the face of the cutting die and the diameter of which is as much smaller than the die ($m$,) of the former (B) as will admit a surrounding thickness of stock between the former (B), has entered the cutting die, (E). This cutting die plate is secured within the "bed-piece" A (Fig. 3,) of the press by screws J, J, and so arranged that by the descent of the plunger the former without fail will enter the recess of the cutting die. A piece of sheet metal being now inserted beneath the former B, it is made to descend and cut a circular piece from the stock, which rests upon the top of the fixed former $d$, which by the continued descent of the former (B) presses the disk into the die $m$, of the former, bending the periphery of said disk at right angles with the center, and producing the box cover $x$, at one operation, or descending stroke of the former (B,) as shown in Fig. 2. The former is then raised, the spring of the piston having been compressed reacts and expels the box cover $x$, from the die $m$, and by means of the ordinary clearing device the sheet is stripped from the former, another surface of the sheet is presented to the descending former and another box cover is produced and thus the operation continues.

It will be readily seen that if a circular piece of sheet metal is placed upon the top of the former $d$, though it be cut from the sheet by a separate machine, if it but fills the circumference of the cutting die, a perfect box cover will be formed as well as if cut from the sheet in the manner above described, and it is by this means that I am enabled to work the refuse disks which are cut from the larger sizes of box covers in forming them into rings; into box covers of smaller sizes. A more perfect box cover however, is formed in working from the sheet, than from a disk cut from a sheet by a separate machine. From this box cover (Figs. 13 and 22,) I produce both the "snap" and "spring" locket rim at one operation, the former being produced by the use of the apparatus shown in Fig. 3, which may be described as follows: G is a cutting former having a recess ($b$,) inclosing the spring piston $n$, at the entrance of the recess ($b$) is formed a sharp cutting edge forming an annular cutter $t$, around this upon the outside is an inclined or beveled surface 1, above this is a plane surface 2, terminating with the shoulder 3, and above this is a second plane surface 4 terminating with the shoulder 5. The die F, is wrought in the form desired for the outside of the locket rim, in the center of the die is a fixed cutting former $d$, encircled by a steel collar $i$, which slides vertically in the circular channel formed around the former ($d$) for its reception, and said collar rests upon and is upheld by the spireal springs I, I, three or four in number inclosed in circular cavities beneath the collar. The die is secured withing the "bed piece" A, by screws as shown, and from the flange at the base of the same ascend two posts S, S, each encircled by a spiral spring. The clearer D slides vertically upon these posts, by the combined action of the former (G) and the spiral springs, and in its ascent is stopped by the nuts at the top of the posts. This clearer has a detachable ring $o$, which is held in its place by the bolts $y$, the former in descending enters this ring with the shoulder 5, bearing on the upper surface of the same and with the former it is carried down upon the face of the die. Thus arranged the operation is that a box cover is placed upon the collar $i$, when the former G descends cutting a ring from the box cover which is turned as shown in Fig. 4, and folded or doubled, and pressed into shape as shown in Fig. 5, the collar $i$. receding downward and filling the channel in the die, as the former descends thereinto. The extreme outer edge of locket rim has expanded beyond the shoulder 3, of the former and beneath the inner edge of the clearer ring $o$, and the refuse disk $u$, has passed into the recess $b$, and the spring of the piston is compressed, so that with the ascent of the former (G) which next follows, the disk ($u$) is expelled from the recess and the ascent of the clearer being stopped by coming in contact with the nuts N the completed rim is freed from the surface 2, of the former, as seen in Fig. 6. These pieces being removed, another box cover is placed upon the collar $i$, which has returned by the force of the springs I, I, to the position shown in Fig. 3, and the operation is repeated.

Fig. 16, represents the apparatus for forming the "spring locket" rim and "field piece" in one piece. It consists of a cutting former C, provided with a spring piston $n$, and having an annular ridge $v$ projecting slightly from the face of the former. The forming die F, hub or fixed former $d$, and collar $j$, are the same as those of Fig. 3, except that the collar $j$, is wider than $i$, and in the operation the clearer is unnecessary. The operation is, that a box cover Fig. 22, being placed upon the collar and the former C, made to descend, the refuse disk $u$, is cut from the top by the meeting of the cutting edge $t$, of the former and that around the top of the fixed former $d$, the latter being of a diameter to enter the former, and the further descent of the former C, causes the collar to recede until it rests solidly upon the bottom of the channel, which action carries the severed ring into the die and presses it into the form of a locket rim and "field piece," as shown in Fig. 17, producing the "male" locket rim shown in Fig. 23. The "female" rim is produced in like manner by the apparatus shown in Fig. 18, which differs from the other in the greater projection of the ridge $v$, from the face of the former (C), and in the use of a narrower ring $k$, Fig. 20, by means of which the "field piece" is sunk farther below the face of the rim as shown in Fig. 23. The former next ascends when the force of the springs I, I, raise the collar which lifts the completed rim from the die in the manner shown in Fig. 19.

It should be observed that the apparatus above described as performing the second operation, is not confined to the working of sheet stock, and to the form of the box cover exclusively, as rings formed from metal tubing and of flattened wire may be pressed into the form of locket rims without altering the apparatus in any respect, the function of the cutting device being suspended, (which forms a ring from the box cover,) when the stock used is in the form of a ring.

I am aware that the making of locket rims out of single pieces of metal instead of two or more, and making them out of sheet metal instead of wire, has been previously patented by Charles G. Bloomer April 28, 1857. Also that a locket rim formed by turning a ring so that the outside surface which was on one side of the stock in the sheet, may form the entire surface of the rim is described in the specification attached to Charles W. Clewley's patent of September 6, 1859. Be it therefore understood that these form no part of my invention, which is instead confined to the means by which such locket rims may be produced in a greater degree of perfection, and by two operations instead of three or more operations as heretofore practiced.

What I claim as my invention and desire to secure by Letters Patent is—

1. The combined hollow cutting former (B), and die $m$, in combination with the spring piston $n$, and combined cutting die E, and fixed former $d$, as described, for the purpose specified.

2. The hollow cutting former G, in combination with the spring piston $n$, and combined forming die F, and fixed former $d$, and a sliding collar $i$, substantially as described, for the purpose specified.

3. The sliding clearer D in combination with a detachable ring $o$, substantially as described, for the purpose specified.

4. The hollow cutting former C, in combination with the spring piston $n$, and combined forming die F, and fixed former $d$, and the sliding collar $j$, substantially as described, for the purpose specified.

DANIEL B. WAITE.

Witnesses:
ISAAC A. BROWNELL,
REYNOLDS L. WAITE.